United States Patent
Ryeland et al.

(10) Patent No.: US 10,240,664 B2
(45) Date of Patent: Mar. 26, 2019

(54) TENSIONER WITH HYDRAULIC LOCKING FEATURE

(71) Applicant: Litens Automotive Partnership, Woodbridge (CA)

(72) Inventors: Geoffrey W. Ryeland, North York (CA); Ron Farewell, Mississauga (CA)

(73) Assignee: Litens Automotive Partnership, Woodbridge (CA)

( * ) Notice: Subject to any disclaimer, the term of this patent is extended or adjusted under 35 U.S.C. 154(b) by 224 days.

(21) Appl. No.: 15/320,670

(22) PCT Filed: Jun. 22, 2015

(86) PCT No.: PCT/CA2015/050578
§ 371 (c)(1),
(2) Date: Dec. 21, 2016

(87) PCT Pub. No.: WO2015/192253
PCT Pub. Date: Dec. 23, 2015

(65) Prior Publication Data
US 2017/0175858 A1 Jun. 22, 2017

Related U.S. Application Data

(60) Provisional application No. 62/015,112, filed on Jun. 20, 2014, provisional application No. 62/099,819, filed on Jan. 5, 2015.

(51) Int. Cl.
*F16H 7/12* (2006.01)
*F02B 67/06* (2006.01)
(Continued)

(52) U.S. Cl.
CPC ........... *F16H 7/1236* (2013.01); *F02B 67/06* (2013.01); *F16H 7/0836* (2013.01);
(Continued)

(58) Field of Classification Search
CPC .... F16H 7/1236; F16H 7/0836; F16H 7/0848; F16H 7/02; F16H 2007/0806;
(Continued)

(56) References Cited

U.S. PATENT DOCUMENTS

| | | |
|---|---|---|
| 4,911,679 A | 3/1990 | Inoue et al. |
| 5,065,709 A | 11/1991 | Ito et al. |

(Continued)

FOREIGN PATENT DOCUMENTS

| | | |
|---|---|---|
| CN | 1908465 A | 2/2007 |
| DE | 102013206010 B3 | 7/2014 |

(Continued)

OTHER PUBLICATIONS

ISR for PCT/CA2015/050578 dated Sep. 8, 2015.
(Continued)

*Primary Examiner* — Michael R Mansen
*Assistant Examiner* — Robert T Reese
(74) *Attorney, Agent, or Firm* — Millman IP Inc.

(57) ABSTRACT

In an aspect, a tensioner includes a pulley, a main piston chamber, a reservoir, and first and second fluid passageways connecting the main piston chamber and reservoir, a main piston that is movable in the main piston chamber, a check valve, a control valve, and a movable reservoir member. The check valve prevents flow in one direction through the second passageway and permits flow in an opposing direction through the second passageway. The control valve is movable between to provide a first flow resistance, or a second flow resistance. The movable reservoir member is movable based on the amount of fluid in the reservoir in such a way as to change the volume of the reservoir, such that the reservoir, the main piston chamber and the first and second passageways together are included in a fluid circuit that is substantially free of any compressible fluids.

18 Claims, 13 Drawing Sheets

(51) Int. Cl.
*F16H 7/08* (2006.01)
*F16H 7/02* (2006.01)

(52) U.S. Cl.
CPC ............ *F16H 7/0848* (2013.01); *F16H 7/02* (2013.01); *F16H 2007/0806* (2013.01); *F16H 2007/0812* (2013.01); *F16H 2007/0859* (2013.01); *F16H 2007/0865* (2013.01); *F16H 2007/0885* (2013.01); *F16H 2007/0893* (2013.01)

(58) Field of Classification Search
CPC ..... F16H 2007/0812; F16H 2007/0859; F16H 2007/0865; F16H 2007/0885; F16H 2007/0893; F02B 67/06; B60G 17/08; B60G 2500/10; F16F 9/34; F16F 9/348; F16F 9/504
USPC ......................................................... 474/110
See application file for complete search history.

(56) References Cited

U.S. PATENT DOCUMENTS

| | | | |
|---|---|---|---|
| 5,709,625 A * | 1/1998 | Nakakubo | F01L 1/02 474/110 |
| 6,471,612 B2 | 10/2002 | Nakakubo | |
| 6,648,783 B1 | 11/2003 | Michael et al. | |
| 8,574,107 B2 | 5/2013 | Nakano et al. | |
| 9,677,649 B2 * | 6/2017 | Kitano | F16H 7/1236 |
| 2001/0007841 A1 * | 7/2001 | Nakakubo | F16H 7/0836 474/110 |
| 2007/0032322 A1 | 2/2007 | Beardmore | |
| 2008/0020876 A1 * | 1/2008 | Tanaka | F16C 33/74 474/110 |
| 2009/0298631 A1 | 3/2009 | Joachiam et al. | |
| 2010/0267503 A1 * | 10/2010 | Hartmann | F16H 7/0836 474/110 |
| 2011/0256970 A1 | 10/2011 | Nakano et al. | |
| 2013/0040770 A1 | 2/2013 | Benjamin et al. | |
| 2016/0230854 A1 * | 8/2016 | Kitano | F16H 7/1236 |

FOREIGN PATENT DOCUMENTS

| | | |
|---|---|---|
| DE | 102013014975 A1 | 3/2015 |
| DE | 102013217933 A1 | 3/2015 |
| EP | 0212119 A2 | 3/1987 |
| JP | H0379843 A | 4/1991 |
| JP | H674830 B2 | 9/1994 |
| JP | 8074956 A | 3/1996 |
| JP | 10184825 A | 7/1998 |
| JP | 2000504395 A | 4/2000 |
| JP | 2003139206 A | 5/2003 |
| JP | 2004150602 A | 5/2004 |
| JP | 2006118616 A | 5/2006 |
| JP | 2006125448 A | 5/2006 |
| JP | 2006266311 A | 10/2006 |
| JP | 2007016932 A | 1/2007 |
| JP | 2007024293 A | 2/2007 |
| JP | 2007032678 A | 2/2007 |
| JP | 2007032711 A | 2/2007 |
| JP | 2007315562 A | 12/2007 |
| JP | 2008106842 A | 5/2008 |
| JP | 2008106843 A | 5/2008 |
| JP | 2008106845 A | 5/2008 |
| JP | 2008128261 A | 6/2008 |
| JP | 2008175224 A | 7/2008 |
| JP | 2009257412 A | 11/2009 |
| JP | 2009270642 A | 11/2009 |
| JP | 2010106873 A | 5/2010 |
| JP | 2010121667 A | 6/2010 |
| WO | 2006053617 A1 | 5/2006 |
| WO | 2012031361 A1 | 3/2012 |
| WO | 2013003937 A1 | 1/2013 |
| WO | 2013033822 A1 | 3/2013 |
| WO | 2013159181 A2 | 10/2013 |
| WO | 2014100894 A1 | 3/2014 |

OTHER PUBLICATIONS

WO for PCT/CA2015/050578 dated Sep. 8, 2015.
Office Action for CN2015800306927 dated Jun. 4, 2018.
Office Action for CN2015800306927 dated Jun. 4, 2018—English translation.
Extended European Search Report for PCT/CA2015/050578 dated Jan. 18, 2018.

* cited by examiner

US 10,240,664 B2

TENSIONER WITH HYDRAULIC LOCKING FEATURE

CROSS-REFERENCE TO RELATED APPLICATIONS

This application claims the benefit of U.S. Provisional Patent Application No. 62/015,112 filed Jun. 20, 2014, and U.S. Provisional Patent Application No. 62/099,819 filed Jan. 5, 2015, the contents of both of which are incorporated herein in their entirety.

FIELD

This disclosure relates generally to the art of belt tensioners and more particularly to belt tensioners for vehicular front engine accessory drive systems.

BACKGROUND

Vehicular engines typically employ a front engine accessory drive to transfer power to one or more accessories, such as an alternator, an air conditioner compressor, a water pump and various other accessories. Many different types of tensioner have been proposed throughout the history of internal combustion engines so as to maintain tension in the belt that is used to transfer the power to the accessories. Some tensioners are configured to impart a very high belt tension on the belt in order to ensure that, in all the modes of operation of the engine and accessories, a situation does not occur where the belt slips on one or more of the pulleys that it is engaged with. It would be advantageous to provide a tensioner that can maintain high belt tension when desired, but lower belt tensioner when a high belt tension is not needed. It would further be advantageous to be able to provide such a tensioner with relatively little complexity and at relatively low cost.

SUMMARY

In an aspect, a tensioner is provided for an endless drive member. The tensioner includes a pulley, a main piston chamber, a reservoir, and first and second fluid passageways connecting the main piston chamber and reservoir, a main piston that is movable in the main piston chamber, a check valve, a control valve, and a movable reservoir member. The check valve is positioned to prevent fluid flow in one fluid flow direction between the main piston chamber and the reservoir through the second passageway and to permit fluid flow in an opposing fluid flow direction between the reservoir and the main piston chamber through the second fluid passageway. The control valve is positioned in the first fluid passageway and is movable between a first position to provide a first flow resistance through the control valve, and a second position to provide a second flow resistance through the control valve, wherein the first flow resistance is lower than the second flow resistance. The movable reservoir member in the reservoir is movable based on the amount of fluid in the reservoir in such a way as to change the volume of the reservoir, such that the reservoir, the main piston chamber and the first and second passageways together are included in a fluid circuit that is substantially free of any compressible fluids.

In another aspect, a tensioner is provided for an endless drive member. The tensioner includes a pulley, a main piston chamber, a reservoir, and first and second fluid passageways connecting the main piston chamber and reservoir, a main piston that is movable in the main piston chamber, a check valve, a control valve, and a movable reservoir member. The check valve is positioned to prevent fluid flow in one fluid flow direction between the main piston chamber and the reservoir through the second passageway and to permit fluid flow in an opposing fluid flow direction between the reservoir and the main piston chamber through the second fluid passageway. The control valve is positioned in the first fluid passageway and is movable between a first position to provide a first flow resistance through the control valve, and a second position to provide a second flow resistance through the control valve, wherein the first flow resistance is lower than the second flow resistance. The first and second fluid passageways are both fluidically connected to a first side of the main piston.

In yet another aspect, a method is provided for controlling a tensioner that includes a pulley, a piston chamber, a reservoir, and first and second fluid passageways connecting the piston chamber and reservoir, a piston chamber, a reservoir, and first and second fluid passageways connecting the piston chamber and reservoir, a piston that is movable in the piston chamber, a check valve configured to prevent fluid flow in one fluid flow direction between the piston chamber and the reservoir through the second passageway and to permit fluid flow in an opposing fluid flow direction between the reservoir and the piston chamber through the second fluid passageway, a control valve that is movable between a first position to permit a first fluid flow between the piston chamber and the reservoir through the first passageway and a second position to prevent fluid flow between the reservoir and the piston chamber through the first fluid passageway. The method includes:

a) receiving signals from at least one sensor;
b) predicting, based on the signals, if a tension at least one region of the endless drive member will imminently drop;
c) closing a valve to prevent fluid flow out from the piston chamber to the reservoir, while permitting oil flow into the piston chamber from the reservoir; and
d) advancing the pulley into the endless drive member at least partially by force from the tensioner biasing member as tension in the endless drive member drops and by permitting fluid flow into the piston chamber through the check valve, and preventing fluid flow from the piston chamber into the reservoir through the check valve or the control valve.

Other aspects of embodiments of the disclosure will be understood based on the specification and claims provided herein.

BRIEF DESCRIPTION OF THE DRAWINGS

The foregoing and other aspects of the invention will be better appreciated with reference to the attached drawings, wherein.

DETAILED DESCRIPTION OF EXAMPLE EMBODIMENTS

Figure 1:
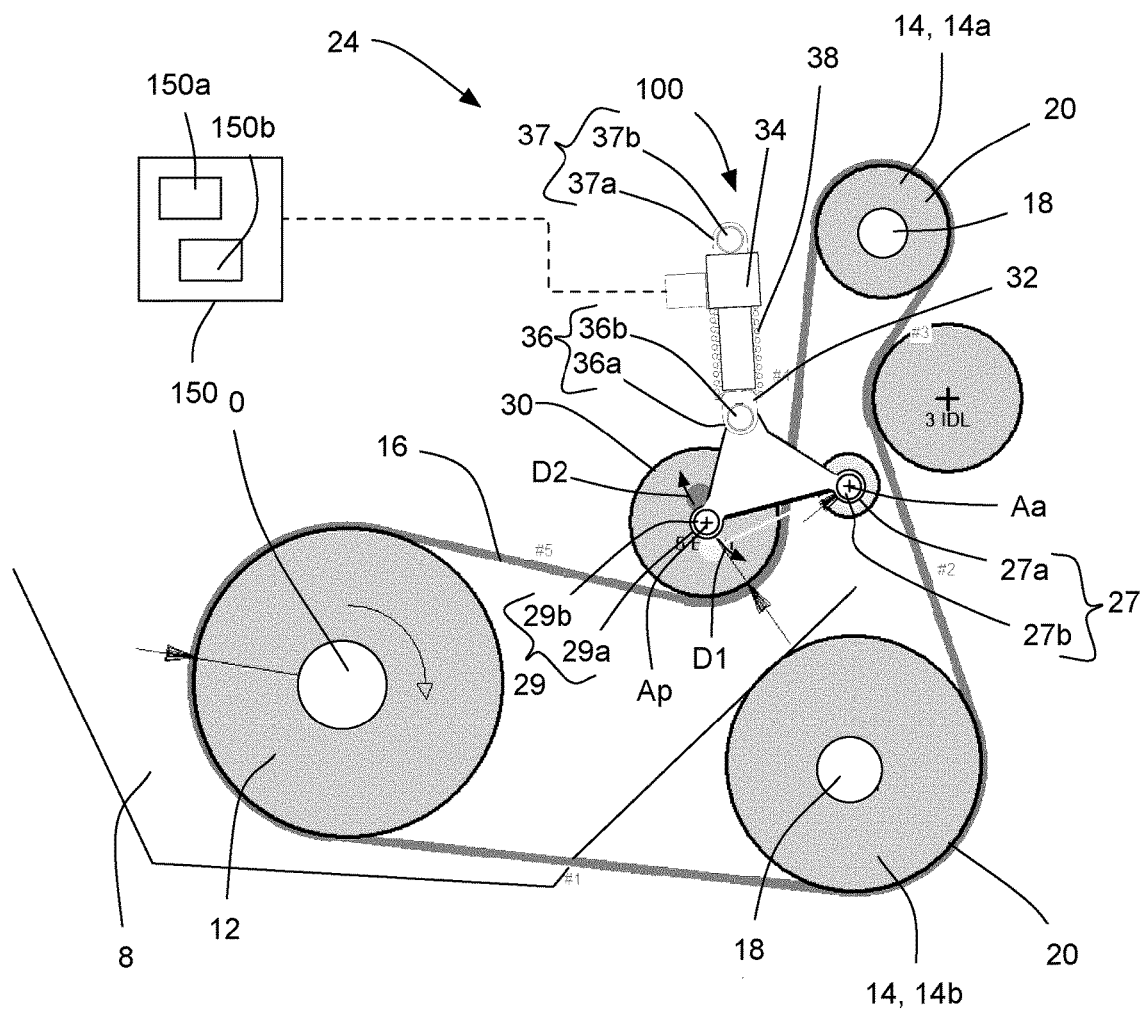
FIG. 1 is an engine with a front engine accessory drive arrangement that includes tensioner in accordance with an embodiment of the disclosure.

FIG. 1 shows an accessory drive system of a vehicle, which is typically disposed at a front end of an engine 8. The engine 8 includes a crankshaft 10 that has a crankshaft pulley 12 mounted thereon. The crankshaft pulley 12 drives one or more vehicle accessories 14 via an endless drive member, such as a belt 16. For convenience the endless drive member will be referred to as a belt, however it will be understood that it could be any other type of endless drive member. The accessories 14 may include a motor-generator unit (MGU) 14a, an air conditioning compressor 14b, a water pump (not shown), a power steering pump (not shown) and/or any other suitable accessory.

In FIG. 1, two accessories 14 are shown, however there could be more or fewer accessories. Each of the driven accessories has a shaft 18 and a pulley 20.

An electrically driven adjustable tensioner 24 is provided to tension the belt 16. The tensioner 24 includes a tensioner strut 100, a tensioner arm 26 that is pivotally mounted to the stationary structure (e.g. the engine 8) via a pivot connection 27 for pivoting movement about a first arm pivot axis Aa. The pivot connection 27 may be provided by a ring 27a on the arm 26 that connects to a pivot shaft 27b on the engine 8. A pulley 30 is pivotally mounted to the tensioner arm 26 via a second pivot shaft 29 for rotation about a pulley axis Ap that is offset from the arm pivot axis Aa. The tensioner arm 26 shown in FIG. 1 is shown as having a generally triangular shape, but it will be understood that it may have any suitable shape and that the shape shown is merely for convenience.

The tensioner strut 100 is mounted between the tensioner arm 26 and a stationary structure, such as the engine 8 or any other structure that is stationary relative to the engine, such as a bracket mounted to the engine 8.

Figure 2:
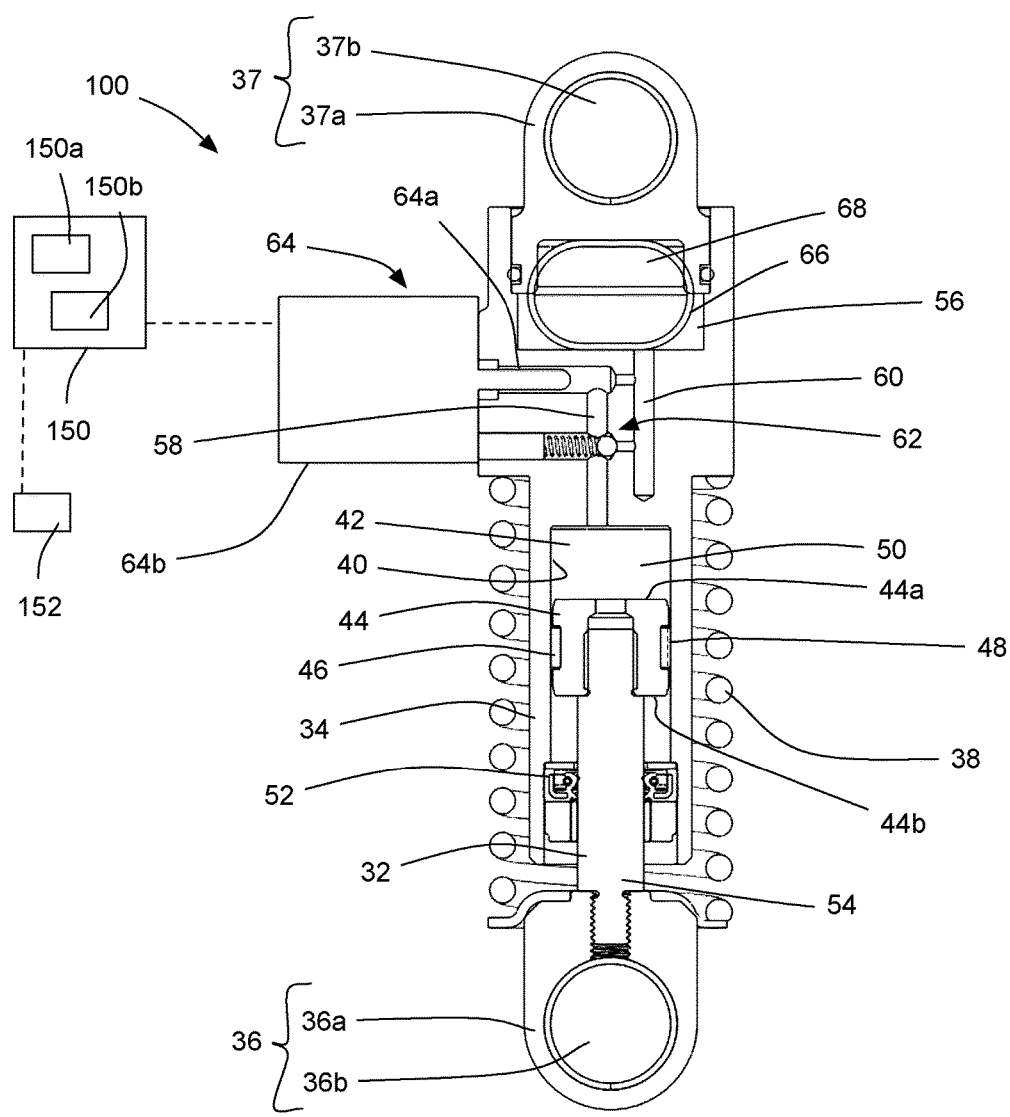
FIG. 2 is a sectional elevation view of a strut that is part of the tensioner shown in FIG. 1.
Figure 2A:
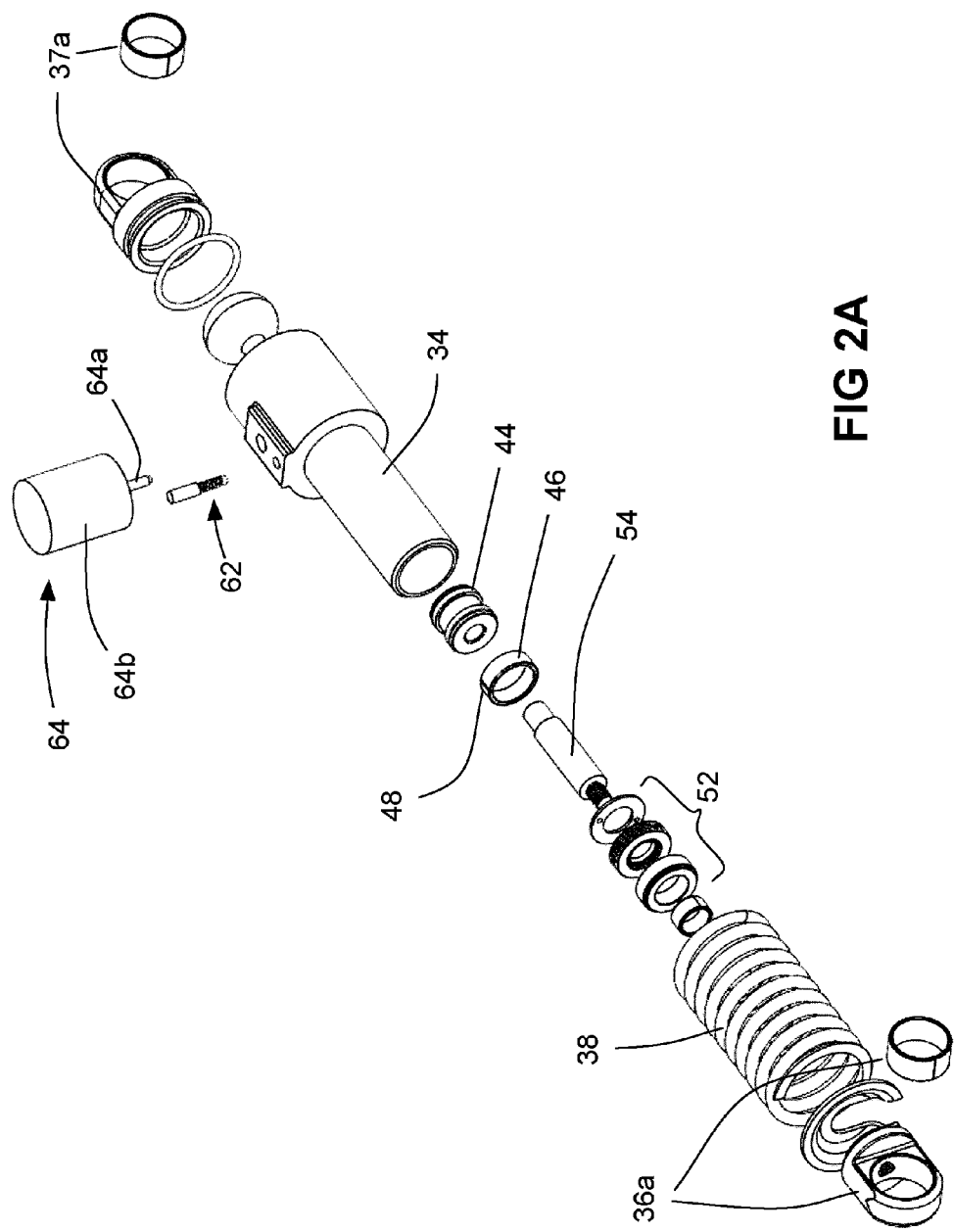
FIG. 2A is an exploded perspective view of the strut shown in FIG. 2.

Reference is made to FIGS. 2 and 2A. The tensioner strut 100 includes an extensible member 32 slidably disposed in a housing 34. The extensible member 32 is pivotally mounted to the tensioner arm 26 via a pivot connection 36 formed by a ring 36a on the extensible member 32 that mounts to a pivot shaft 36b on the arm 26 (FIG. 1). The housing 34 is pivotally mounted to the stationary member (e.g. the engine 8 shown in FIG. 1) via a pivot connection 37 formed by a ring 37a on the housing 34 that mounts to a pivot shaft 37b on the stationary member (e.g. the engine 8).

A tensioner arm biasing member 38 such as a coil spring is disposed between the extensible member 32 and housing 34 so as to urge the extensible member 32 out of the housing 34 and push the tensioner arm 26 towards the belt 16. Thus, the tensioner arm 26 moves along an arcuate path between a 'free arm' position, which is an end of travel location along the path that the tensioner arm 26 is capable of reaching in the direction urged by the biasing member 38, and a 'load-stop' position which is the position of farthest travel that would occur due to force exerted by the belt 16 on the pulley 30 (away from the free-arm position. The directions of travel of the tensioner arm 26 may be referred to as the 'free arm' direction when traveling towards the free arm position (shown by arrow D1 in FIG. 1) and the 'load-stop' direction when traveling towards the load-stop position, and therefore away from the free-arm position, (shown by arrow D2 in FIG. 1). The free-arm and load-stop positions may be defined by pairs of mechanical limit surfaces that are engaged with one another at selected points in the travel of the tensioner arm 26.

Referring to FIG. 2, an inner wall 40 of the housing 34 defines a main piston chamber 42. The extensible member 32 includes a main piston 44 that is movable in the main piston chamber 42. A bushing 46 is provided on the piston 40 and engages the inner wall 40. The bushing 46 provides a selected amount of damping for the movement of the piston 44. The damping provided by the bushing 46 may be provided by virtue of friction that exists between the bushing 46 and the inner wall 40 during movement of the piston 44 in the piston chamber 42. Additionally or alternatively, the damping may be provided by an optional passage 48 that has a selected cross-sectional area so as to control a flow of hydraulic fluid 50 between a first side 44a of the piston 44 and a second side 44b of the piston 44 during movement of the piston 44 in the piston chamber 42.

A piston chamber seal structure 52 is provided for sealing against the piston rod (shown at 54) so as to prevent leakage of hydraulic fluid 50 from the chamber 42. The seal structure 52 may be any suitable type of seal structure.

Figure 3:
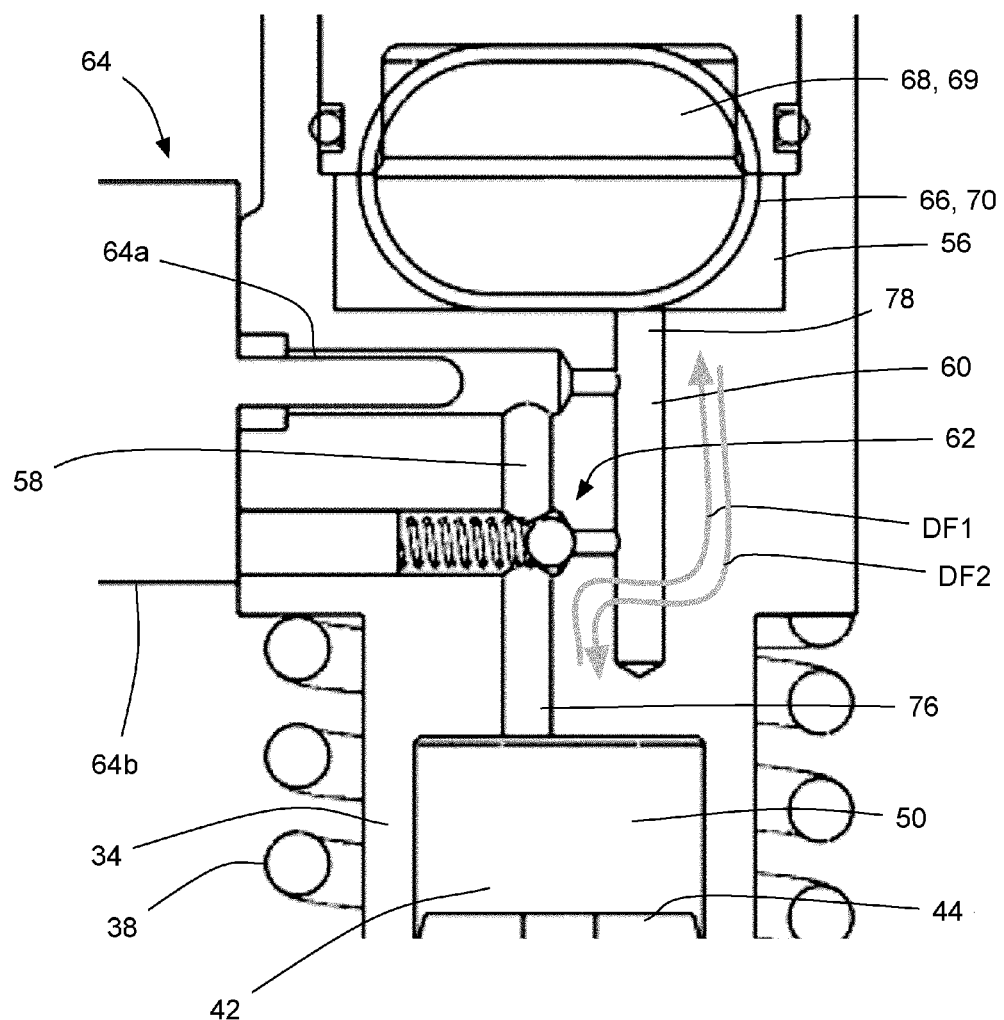
FIG. 3 is a magnified sectional elevation view of the strut shown in FIG. 2 with a control valve in a first position.

Referring to FIG. 3, a reservoir 56 is provided. A first passageway 58 and a second passageway 60 fluidically connect the main piston chamber 42 and the reservoir 56. A check valve 62 is provided and is positioned to prevent fluid flow in a first fluid flow direction (shown by arrow DF1 in FIG. 3) between the main piston chamber 42 and the reservoir 56 through the second passageway 60 and to permit fluid flow in an opposing fluid flow direction (shown by arrow DF2 in FIG. 3) between the reservoir 56 and the main piston chamber 42 through the second fluid passageway 60.

A control valve 64 is positioned in the first fluid passageway 58 and is movable between a first position (FIG. 3) to provide a first flow resistance through the control valve, and a second position (FIG. 4) to provide a second flow resistance through the control valve, wherein the first flow resistance is lower than the second flow resistance. In the embodiment shown, the first flow resistance is non-infinite (i.e. some fluid flow is permitted through the control valve 64), and the second flow resistance is infinite (i.e. the control valve 64 is in a closed position so as to substantially prevent fluid flow between the reservoir 56 and the main piston chamber 42 through the first fluid passageway 58).

Referring to FIG. 3, the control valve 64 includes a valve member 64a and an actuator 64b. The valve member 64a is the member that is movable to control the fluid flow through the control valve 64. The actuator 64*b* is the device that moves the valve member 64*a*. Embodiments of the valve member 64*a* and actuator 64*b* are described further below.

A movable reservoir member 66 is provided in the reservoir 56 and is movable based on the amount of fluid in the reservoir in such a way as to change the volume of the reservoir 56, such that the reservoir 56, the main piston chamber 42 and the first and second passageways 58 and 60 together are included in a fluid circuit that is substantially free of any compressible fluids. A reservoir biasing member 68 is positioned to bias the reservoir movable member 66 to drive fluid from the reservoir 56 towards the main piston chamber 42. As a result, the operability of the strut 100 is not dependent on its orientation. By contrast, with some tensioners of the prior art that incorporate struts with hydraulic fluid, there is a gas that is directly in the fluid circuit. When such struts are inverted from their expected operating orientation, they are susceptible to leakage or ineffective operation.

In the embodiment shown in FIG. 3, the reservoir movable member 66 is a gas-filled bladder 70, and the reservoir biasing member 68 is the gas (shown at 69) inside the bladder 70, which is a compressible fluid. Because the gas is in the bladder 70 however, the gas is not in the fluid circuit itself. Alternatively the reservoir biasing member 68 could be in the form of a closed cell foam element in the bladder 70, or any other resiliently compressible substance.

Figure 4:
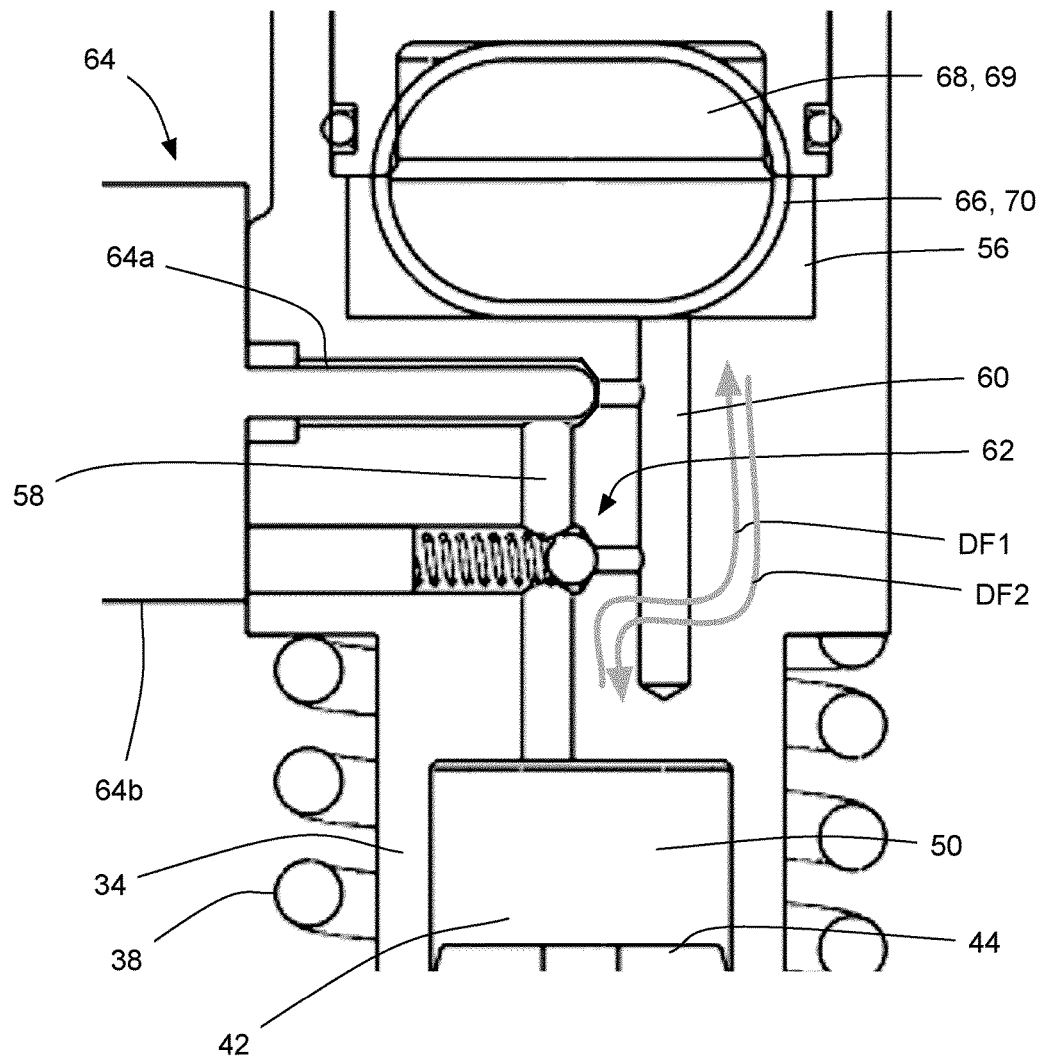
FIG. 4 is a magnified sectional elevation view of the strut shown in FIG. 2 with the control valve in a second position.
Figure 7:
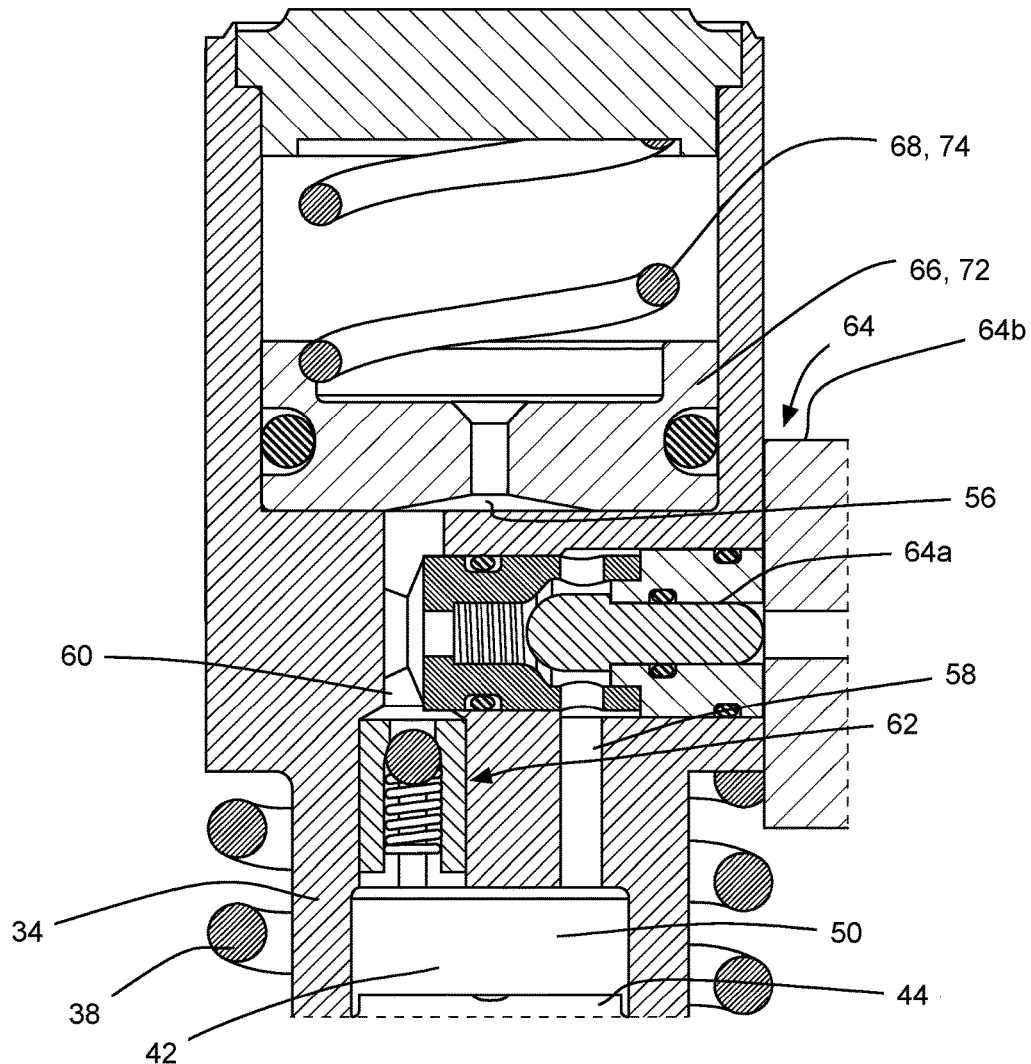
FIG. 7 is a magnified sectional view of an alternative embodiment of a strut.

The reservoir biasing member 68 and the reservoir movable member 66 may have other configurations than that shown in FIGS. 3 and 4. For example, in an embodiment shown in FIG. 7, the movable reservoir member 66 is in the form of a secondary piston 72 (which may also be referred to as a reservoir piston 72). The reservoir piston 72 is urged in a first direction towards reducing the volume of the reservoir 56 by a helical coil compression spring 74, which is the reservoir biasing member (and which is therefore also identified in FIG. 7 with reference number 68.

It will be noted that the first and second passageways 58 and 60 may share some common portions, such as, for example a piston chamber segment shown at 76 and a reservoir segment 78. This sharing of segments is possible (particularly the piston chamber segment) is possible because the first and second passageways are both fluidically connected to the main piston chamber 42 on the same side of the main piston 44. This facilitates construction of the strut 100 and in particular sealing the strut 100 against leakage of hydraulic fluid 50. In some prior art tensioners that incorporate a strut with a hydraulic fluid, a reservoir is provided in a surrounding relationship to a piston chamber and a relatively complex seal system is provided in order to maintain a seal while permitting extension and retraction of the strut.

Figure 5A:
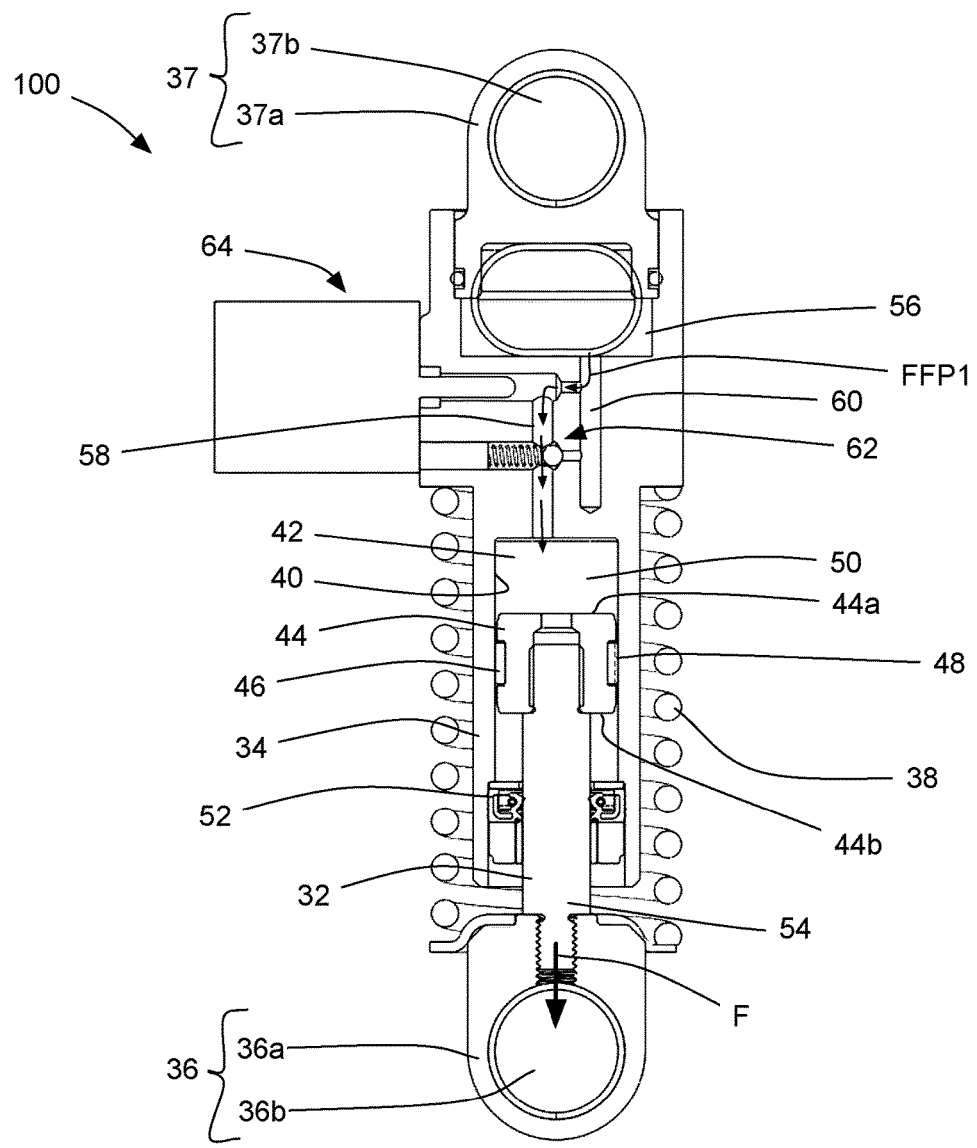
FIG. 5A is a sectional elevation views of the strut shown in FIG. 2 showing the control valve in the first position with a decreasing belt tension.
Figure 5B:
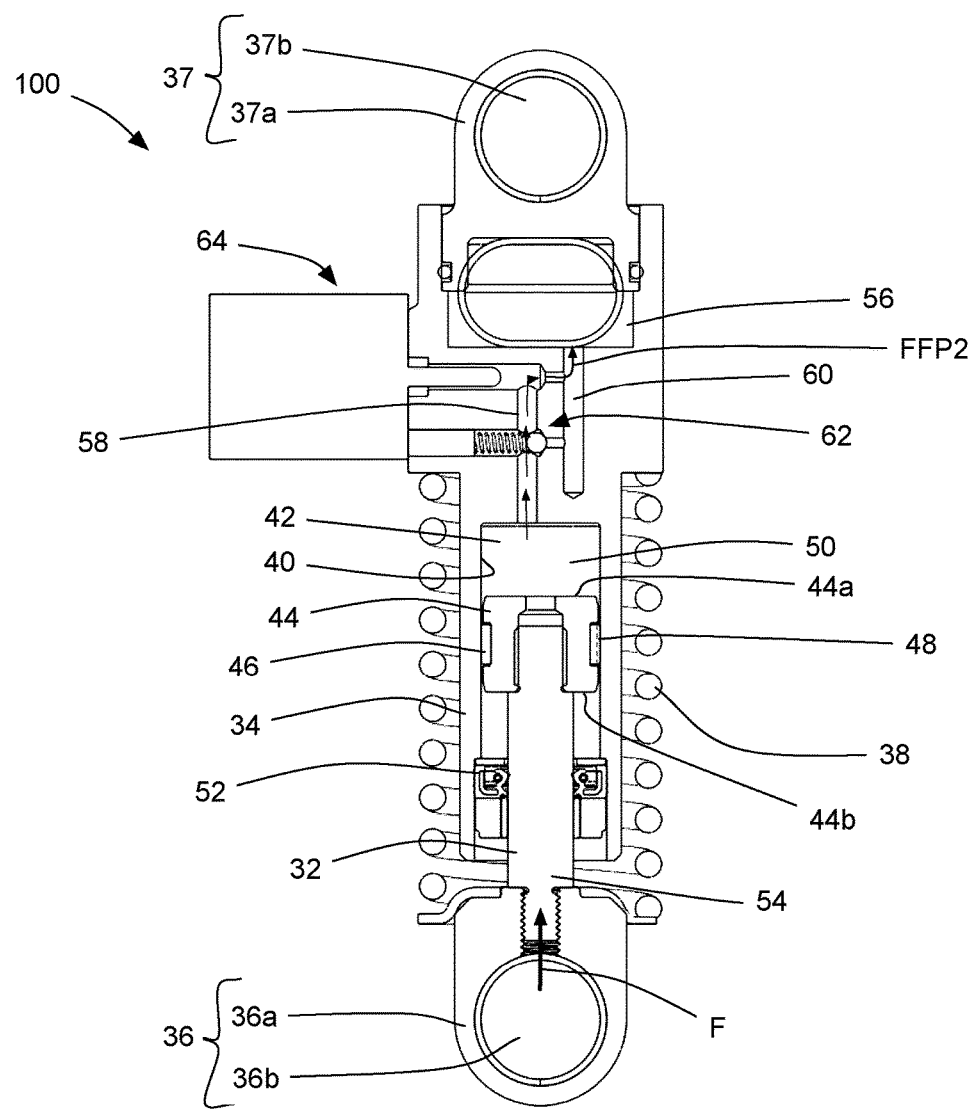
FIG. 5B is a sectional elevation views of the strut shown in FIG. 2 showing the control valve in the first position with an increasing belt tension.

FIGS. 5A and 5B illustrate the operation of the strut 100 when the control valve 64 is in the first position. Referring to FIGS. 1 and 5A, when the tensioner strut 100 is in equilibrium and a certain type of event occurs where the belt tension decreases (e.g. the MGU 14*a* is no longer needed to charge a battery of the vehicle), the hydraulic fluid 50, the reservoir biasing member 68 and the tensioner biasing member 38 all apply forces on the piston 44 and the extensible member 34 which may overcome the resistive force applied by the belt 16, resulting in a net force F on the piston 44 and the extensible member 34, which is in a direction of extending the extensible member 34 and driving the tensioner arm 26 and the pulley 30 in the direction D1 (the free arm direction) shown in FIG. 1. Because the control valve 64 is in the first position, hydraulic fluid 50 can flow from the reservoir 56 to the main piston chamber 42 along a first fluid flow path FFP1 shown in FIG. 5A, which is through the first passageway 58. As a result, the extensible member 32 extends from the housing 34 driving the pulley 30 into the belt 16 until equilibrium is once again reached.

Referring to FIGS. 1 and 5B, when the tensioner strut 100 is in equilibrium and the control valve 64 is in the first position, and a certain type of event occurs where the belt tension increases (e.g. the MGU 14*a* is needed to charge a battery of the vehicle), the hydraulic fluid 50, the reservoir biasing member 68 and the tensioner biasing member 38 all apply forces on the piston 44 and the extensible member 34 all apply a resistive force which may be overcome by the increased belt tension acting on the pulley 30, resulting in the net force F shown in FIG. 5B, which is in a direction of retracting the extensible member 34 and driving the tensioner arm 26 and the pulley 30 in the direction D2 (the load stop direction) shown in FIG. 1. Because the control valve 64 is in the first position, hydraulic fluid 50 can flow from the main piston chamber 42 to reservoir 56 along a second fluid flow path FFP2 shown in FIG. 5A, which is through the first passageway 58 and which may be the same as the first fluid flow path FFP1.

Figure 6A:
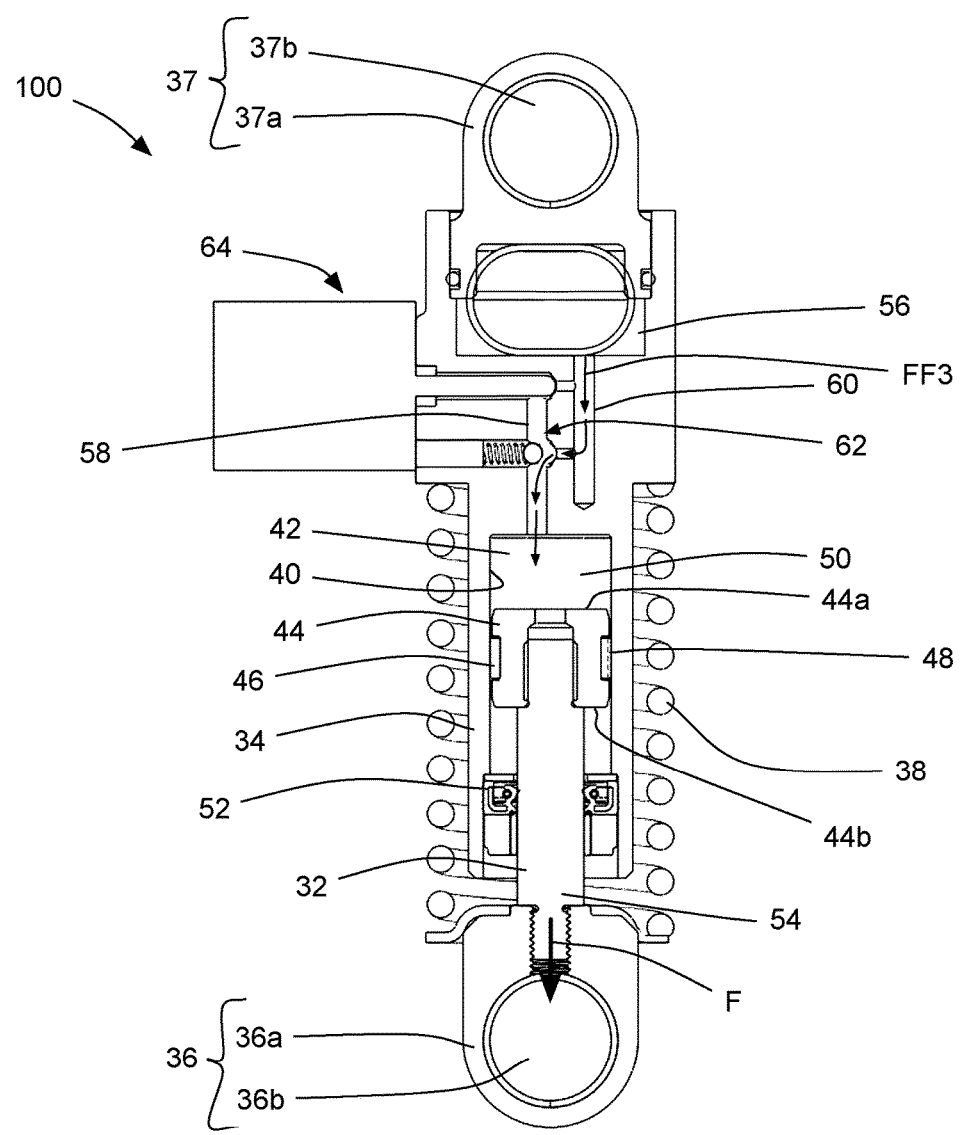
FIG. 6A is a sectional elevation views of the strut shown in FIG. 2 showing the control valve in the second position with a decreasing belt tension.
Figure 6B:
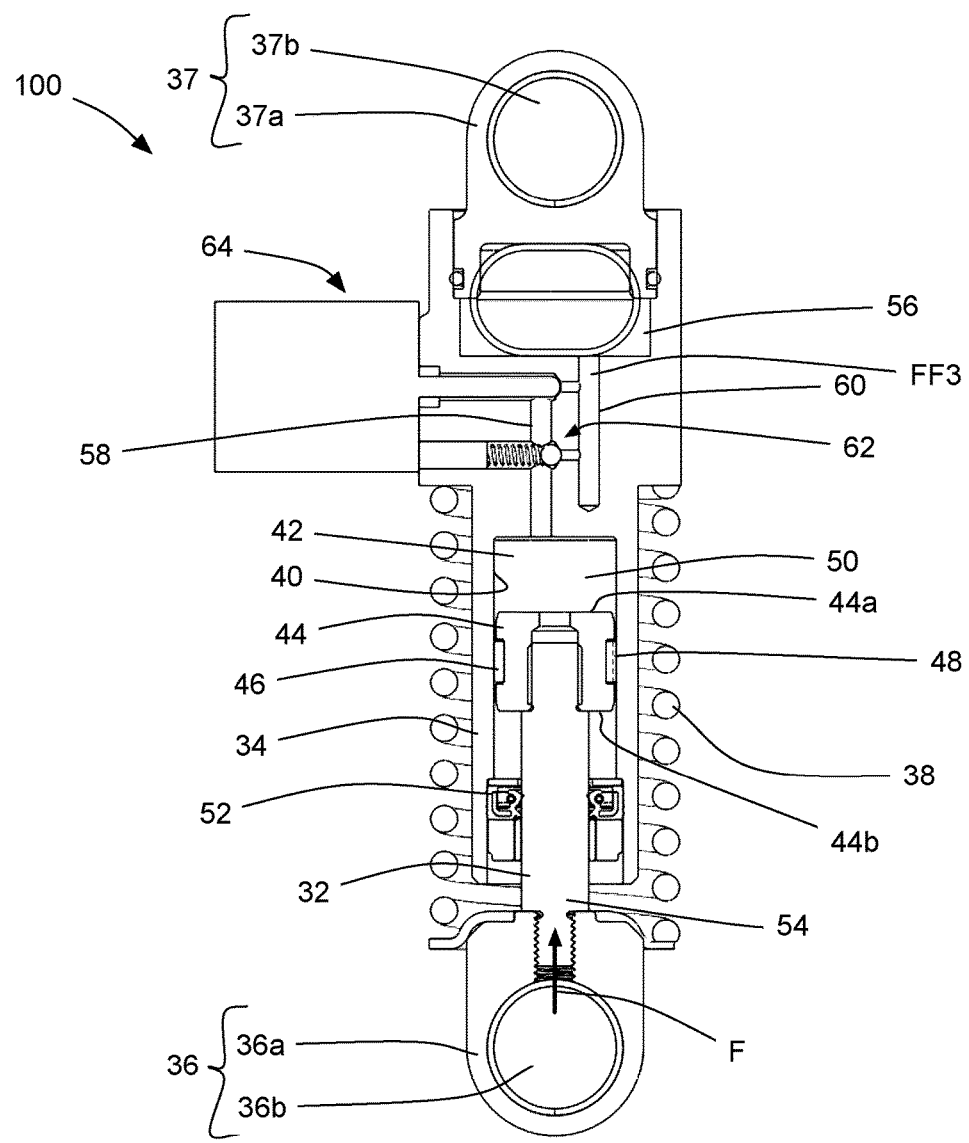
FIG. 6B is a sectional elevation views of the strut shown in FIG. 2 showing the control valve in the second position with an increasing belt tension.

FIGS. 6A and 6B illustrate the operation of the strut 100 when the control valve 64 is in the second position. Referring to FIGS. 1 and 6A, when the tensioner strut 100 is in equilibrium and a certain type of event occurs where the belt tension decreases (e.g. the MGU 14*a* is no longer needed to charge a battery of the vehicle), the hydraulic fluid 50, the reservoir biasing member 68 and the tensioner biasing member 38 all apply forces on the piston 44 and the extensible member 34 which may overcome the resistive force applied by the belt 16, resulting in a net force F on the piston 44 and the extensible member 34, which is in a direction of extending the extensible member 34 and driving the tensioner arm 26 and the pulley 30 in the direction D1 (the free arm direction) shown in FIG. 1. Because the control valve 64 is in the second position, hydraulic fluid 50 cannot flow from the reservoir 56 to the main piston chamber 42 along the first fluid flow path FFP1 shown in FIG. 5A, but it can flow along a third fluid flow path FFP3 shown in FIG. 6A, which is through the second passageway 60. As a result, the extensible member 32 extends from the housing 34 driving the pulley 30 into the belt 16 until equilibrium is once again reached.

Referring to FIGS. 1 and 6B, when the tensioner strut 100 is in equilibrium and the control valve 64 is in the second position, and a certain type of event occurs where the belt tension increases (e.g. the MGU 14*a* is needed to start the engine 8 or boost power in conjunction with the engine 8), the check valve 62 and the control valve 64 prevent fluid flow from the main piston chamber 42 to the reservoir 56. Since the fluid 50 is substantially incompressible, the belt tension can increase without any retraction of the extensible member 32, i.e. without any movement of the tensioner arm 26 in the load-stop direction. In the positions and conditions shown in FIGS. 5A, 5B and 6A, the fluid pressures in the reservoir 56 and the piston chamber 42. However, in the situation illustrated in FIG. 6B, the pressure in the piston chamber 42 may be relatively higher than that in the reservoir 56. For example, the pressure may be about 22 MPa or even higher in the piston chamber 42, while the pressure in the reservoir 56 may be about 0.5 MPa or even lower.

Figure 4A:
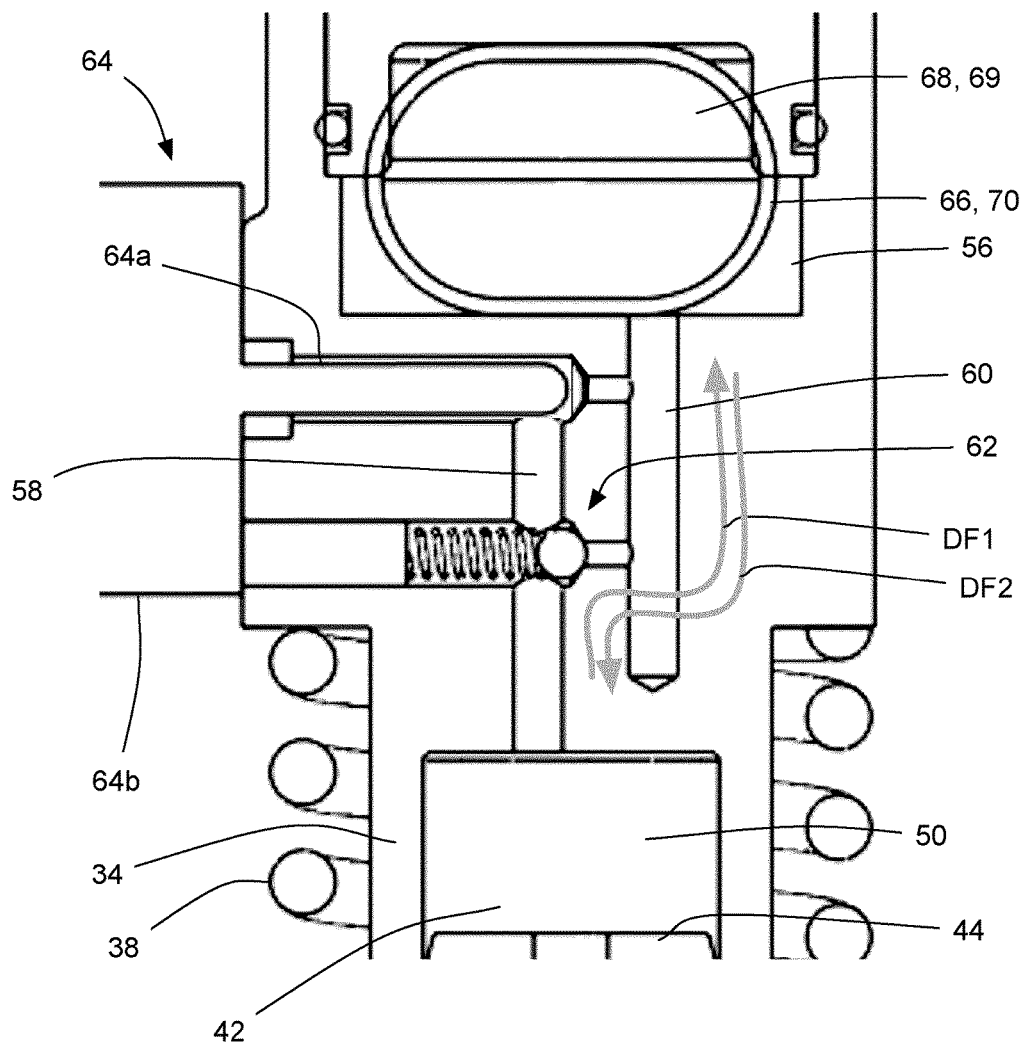
FIG. 4A is a magnified sectional elevation view of the strut shown in FIG. 2 with the control valve in a third position.

In an embodiment, the actuator 64*b* may be configured to be able to position the valve member 64*a* in at least one intermediate position that is between the first and second positions. The intermediate position is shown in FIG. 4A. Thus, it may be said that the control valve 64 is positionable in at least one intermediate position between the first and second positions, to provide a third flow resistance through the control valve 64 that is between the first and second flow resistances. This third position may provide a selected amount of damping to the movement of the piston 44 in the piston chamber 42 in situations where such damping is desired, such as during moments where torsional vibrations may be especially high. The damping provided when in this third position is different than the damping provided by the piston bushing 46 in that the damping provided by the control valve 64 in the third position can be velocity dependent, and is selectable over a range of positions of the valve member 64a.

Figure 8:
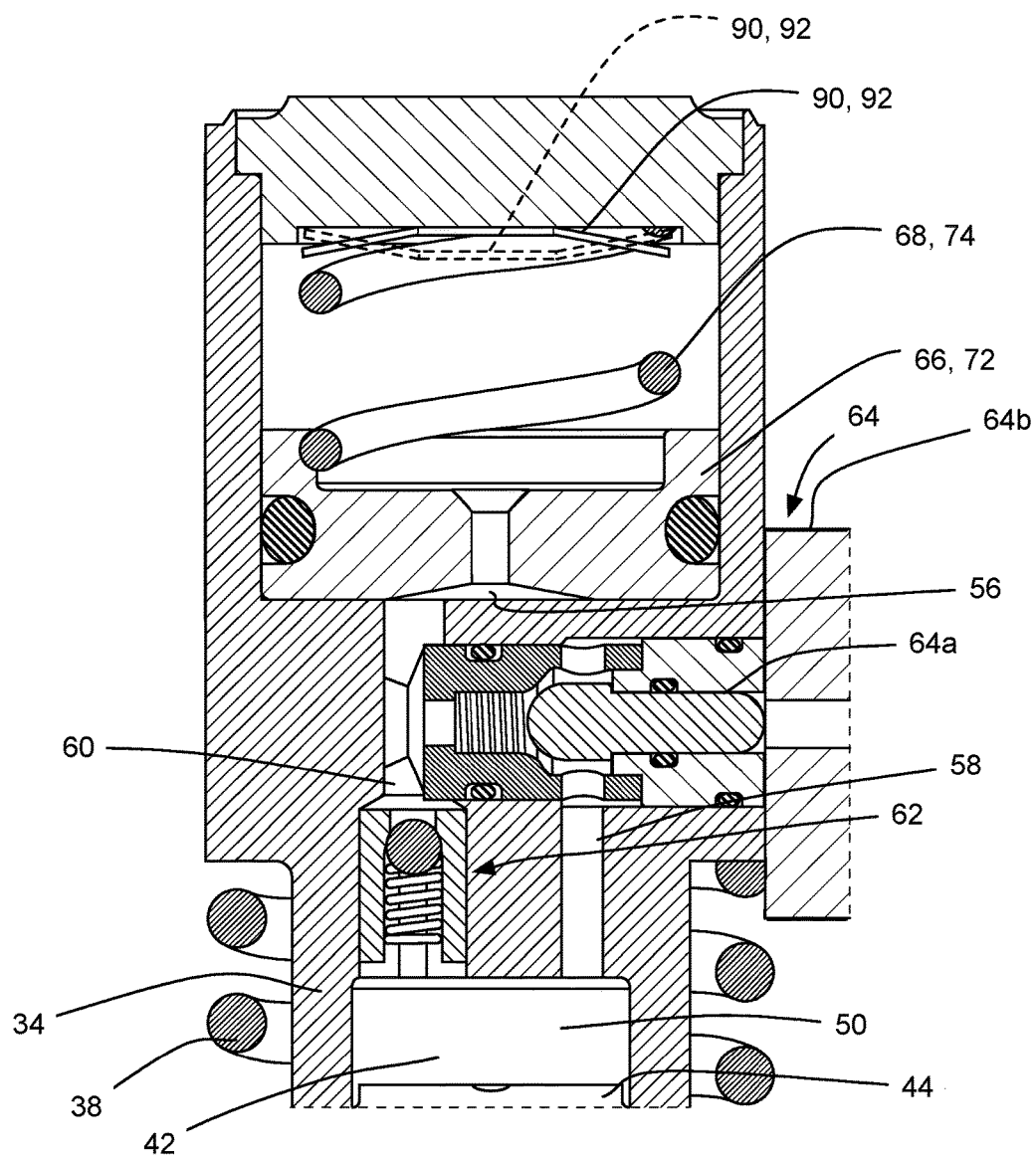
FIG. 8 is a magnified sectional view of an yet another alternative embodiment of a strut.

It will be understood that the hydraulic fluid 50 in some embodiments may be subject to variable viscosity based on the ambient temperature. In such a case, optionally, the reservoir biasing member 68 may be configured to include a viscosity compensation member 90 that is a thermally responsive member that moves between a first position and a second position based on temperature and is positioned to control a biasing force of the reservoir biasing member 68. In some embodiments, the viscosity compensation member 90 may be integral with the compression spring 74 and may be achieved by forming the compression spring 74 from a shape-memory alloy that urges it towards a relatively longer rest length when the ambient temperature increases and a relatively shorter rest length when the ambient temperature decreases. Examples of manufacturers of shape-memory allow products include, for example, Dynalloy, Inc. of Irvine, Calif., USA. In another embodiment, the viscosity compensation member 90 may be in the form of a snap disk 92 as shown in FIG. 8. The snap disk 92 is shown in solid lines in a first compensation member position and in dashed lines in a second compensation member position. In the first position the snap disk 92 causes a first amount of flexure of the reservoir biasing member 74, and in the second position the snap disk 92 causes a second amount of flexure of the reservoir biasing member 74 that is different than the first amount of flexure. As can be seen, when the snap disk 92 is in the first position, it would push the end of the spring 74 downwards, compressing it such that the biasing force of the spring 74 would be relatively higher, whereas when the snap disk 92 is in the second position, it would permit some elongation of the spring 74, so that the spring 74 is less compressed throughout movement of the reservoir piston 72, such that the biasing force from the spring 74 would be relatively lower than when the snap disk 92 is in the first position. As a result, the snap disk 92 can be positioned so that, when the ambient temperature increases beyond a selected temperature the snap disk 92 is positioned to increase the biasing force applied by the reservoir biasing member 74 and when the ambient temperature drops below the selected temperature the snap disk 92 is in is positioned to decrease the biasing force applied by the reservoir biasing member 74.

Referring to FIGS. 1 and 2, the actuator 64b is controlled by a control system 150. The control system 150 may include a single controller, as shown in FIGS. 1 and 2, or it may be made up of a plurality of controllers in a network. The control system 150 may be provided as part of a package that includes the strut 100, the arm 26, the pulley 30, or alternatively, the control system 150 may be a unit that is provided separate from the other aforementioned components. The control system 150 may, for example, be a vehicle engine control unit that is provided by a business entity that is separate from the business entity that provides the other components. In such a case, the tensioner 24 may be said to not include the control system 150. Alternatively, the tensioner 24 may be provided with a control system 150.

The control system 150 includes at least a processor 150a and a memory 150b. The control system 150 may be programmed as suitable to send signals (e.g. electrical signals) to the actuator 64b to move the valve member 64a between the first and second positions. For example, in the event that the control system 150 receives input from one or more sensors that indicate that the belt tension is about to increase significantly, the control system 150 can send a signal to the actuator 64b to drive the valve member 64a to the second position (FIG. 4). In the event that the belt tension decreases prior to the expected increase, the tensioner pulley 30 is driven in the free arm direction as shown in FIG. 6A, and thus is driven into the belt 16. When the expected increase in belt tension occurs, the extensible member 32 is prevented from retracting.

In the event that torsional vibrations occur when the control valve 64 is in the second position, due to the reciprocating movement of the engine's pistons, there will be a cyclical increase and decrease in the belt tension. During the moments that the belt tension decreases, the pulley 30 will be driven into the belt 16 by some amount. During the subsequent moment when the belt tension increases the pulley 30 will not retract. During the following moment when the belt tension decreases, the pulley 30 will be driven a bit further into the belt 16. Then, during the next moment when the belt tension increases again, the pulley 30 will again not retract. Thus, a sort of ratcheting effect takes place, driving the pulley 30 farther and farther into the belt 16 until the belt tension is sufficiently high that no further movement occurs in the extensible member. Once the control system 150 instructs the actuator 64b to move the valve member 64a to the first position, the belt tension can drive the pulley and therefore the extensible member to retract until equilibrium is reached.

Figure 9:
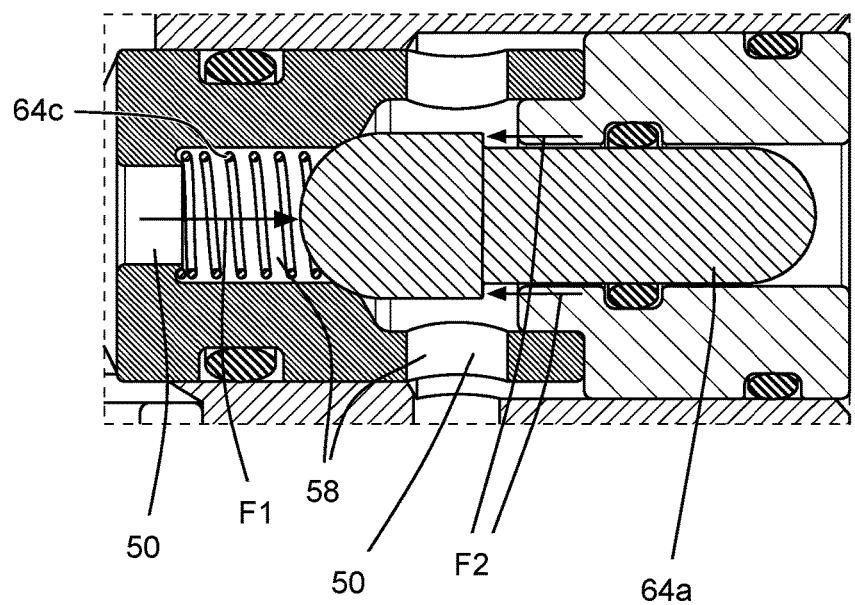
FIG. 9 is a magnified sectional view of an alternative embodiment of a portion of the control valve shown in FIG. 2.
Figure 10:
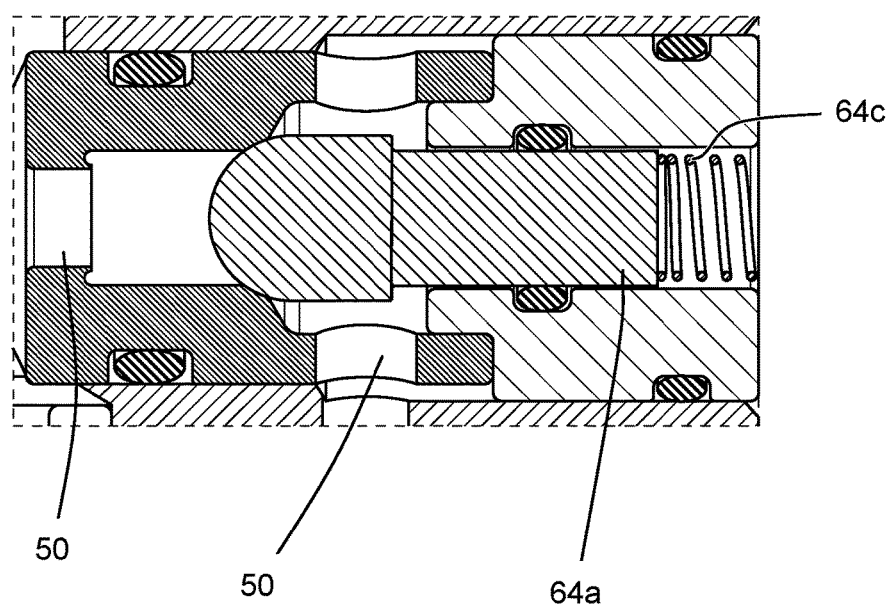
FIG. 10 is a magnified sectional view of an alternative embodiment of the portion of the control valve shown in FIG. 9.

Referring to FIG. 2, the actuator 64b may be any suitable type of actuator, such as, for example, a linear, two position solenoid. The solenoid may be configured to remain in whichever position it was last moved to, or it may be biased to return to a particular position upon a cutoff of power. The actuator 64b may be separate from the valve member 64a so as to provide added flexibility as to which components are used to assemble the control valve 64. In other words, the actuator 64b may include a projection (e.g. the solenoid rod) that simply abuts the valve member 64a, without being fixedly connected to the valve member 64a. FIG. 9 shows an example of the valve member 64a. In the example shown in FIG. 9, the control valve 64 includes a valve member biasing member 64c. The valve member 64a is movable by the actuator 64b between first and second positions (FIGS. 3 and 4) which correspond to the first and second positions for the control valve 64. The valve member biasing member 64c urges the valve member 64a towards one of the first and second positions. In the example shown in FIG. 9, the biasing member 64c urges the valve member towards the first position. In the example shown in FIG. 10, the biasing member 64c urges the valve member towards the second position.

Returning to the example shown in FIG. 9, when the valve member 64a is in the second valve member position (shown in FIG. 9), a first force F1 generated by fluid pressure acting on a first surface (shown at 110) of the valve member 64a is overcome by a second force F2 generated by fluid pressure acting on a second surface (shown at 112) of the valve member 64a sufficiently to hold the valve member 64a in the second position. This is achieved by sizing the first and second surfaces 110 and 112 such that their relative areas result in a net force towards the second position. It is alternatively possible to select the first and second surfaces such that there is a net force that would hold the valve member 64a in the first position.

The hydraulic fluid 50 that is selected for use in the tensioner 24 may be any suitable hydraulic fluid and may include such components as an anti-foaming agent to inhibit foaming that can occur in some fluids during movement of elements relative to one another.

In some embodiments, the control system may be programmed to:
a) determine whether there is a failure in the tensioner 24; and
b) output a signal (e.g. to a display 152 that may be in a vehicle) that is indicative of a failure in the tensioner 24 based on the determination made in step a). More specifically, the control system 150 may be programmed to:
c) control current to the actuator 64b so as to control the position of the control valve 64; and
d) determine the position of the main piston 44 in the main piston chamber 42; and
e) output a signal (e.g. to the display 152) that is indicative of a failure in the tensioner 24 based on the current to the actuator 64b and the determination made in step d). In step d) the control system may determine the position of the main piston 44 in the main piston chamber 42 based on signals from a sensor that are indicative of whether there is belt slip. In other words, if the control system 150 detects belt slip, but has already commanded the actuator 64b to move the valve member 64a to the second position, then the control system 150 can determine that the valve member 64a has not moved to the second position and therefore that the piston 44 is not prevented from retracting. Belt slip can be detected by the control system 150 including an encoder on a selected pulley in the accessory drive, and another encoder on the crankshaft pulley 12.

While it has been described to use the tensioner 24 with a front engine accessory drive arrangement that includes an MGU 14a, it is alternatively possible to use the tensioner 24 on a front engine accessory drive arrangement that uses an alternator and that does not permit the starting of the engine 8 using an MGU. The control system 150 can be used in any situation where a high belt load is anticipated, such as when starting the engine 8.

While the description contained herein constitutes a plurality of embodiments of the present invention, it will be appreciated that the present invention is susceptible to further modification and change without departing from the fair meaning of the accompanying claims.

The invention claimed is:
1. A tensioner for an endless drive member, comprising:
a pulley;
a main piston chamber, a reservoir, and first and second fluid passageways connecting the main piston chamber and reservoir;
a main piston that is movable in the main piston chamber;
a check valve positioned to prevent fluid flow in one fluid flow direction between the main piston chamber and the reservoir through the second passageway and to permit fluid flow in an opposing fluid flow direction between the reservoir and the main piston chamber through the second fluid passageway;
a control valve that is positioned in the first fluid passageway and which is movable between a first position to provide a first flow resistance through the control valve, and a second position to provide a second flow resistance through the control valve, wherein the first flow resistance is lower than the second flow resistance; and
a movable reservoir member in the reservoir that is movable based on the amount of fluid in the reservoir in such a way as to change the volume of the reservoir, such that the reservoir, the main piston chamber and the first and second passageways together are included in a fluid circuit that is substantially free of any compressible fluids.

2. A tensioner as claimed in claim 1, further comprising a reservoir biasing member that is positioned to bias the reservoir movable member to drive fluid from the reservoir towards the main piston chamber.

3. A tensioner as claimed in claim 2, wherein the movable reservoir member is a reservoir piston that is biased by the reservoir biasing member in a first reservoir piston direction to drive fluid out from the reservoir towards the main piston chamber.

4. A tensioner as claimed in claim 2, further comprising a viscosity compensation member that is positioned to control a spring rate of the reservoir biasing member.

5. A tensioner as claimed in claim 2, wherein the viscosity compensation member includes a thermally responsive member that moves between a first compensation member position and a second compensation member position based on ambient temperature, wherein in the first compensation member position the viscosity compensation member causes a first amount of flexure of the reservoir biasing member, and in the second compensation member position the viscosity compensation member causes a second amount of flexure of the reservoir biasing member that is different than the first amount of flexure.

6. A tensioner as claimed in claim 1, wherein the movable reservoir member is a bladder in the reservoir that is filled with a resiliently compressible substance.

7. A tensioner as claimed in claim 1, wherein the movable reservoir member is a closed-cell foam member.

8. A tensioner as claimed in claim 1, further comprising a tensioner pulley biasing member positioned to urge the pulley into the endless drive member and to drive the main piston to move in the main piston chamber in a selected main piston direction so as to drive fluid flow in the opposing fluid flow direction.

9. A tensioner as claimed in claim 1, wherein the one fluid flow direction is from the main piston chamber to the reservoir and the opposing fluid flow direction is from the reservoir to the main piston chamber.

10. A tensioner as claimed in claim 1, wherein the first flow resistance is non-infinite and wherein the second position for the control valve is a closed position so as to prevent flow between the reservoir and the main piston chamber through the first fluid passageway.

11. A tensioner as claimed in claim 1, wherein the control valve is positionable in at least one intermediate position between the first and second positions, to provide a third flow resistance through the control valve that is between the first and second flow resistances.

12. A tensioner as claimed in claim 1, wherein the control valve includes a valve member and an actuator, and a valve member biasing member, wherein the valve member is movable by the actuator between first and second valve member positions that correspond to the first and second control valve positions, and wherein the valve member biasing member urges the valve member towards the first position.

13. A tensioner as claimed in claim 1, wherein the control valve includes a valve member and an actuator, and a valve member biasing member, wherein the valve member is movable by the actuator between first and second valve member positions that correspond to the first and second control valve positions, and wherein the valve member biasing member urges the valve member towards the second position.

14. A tensioner as claimed in claim 13, wherein when the valve member is in the second valve member position, a first force generated by fluid pressure acting on a first surface of the valve member is overcome by a second force generated by fluid pressure acting on a second surface of the valve member sufficiently to hold the valve member in the second position.

15. A tensioner as claimed in claim 1, further comprising a control system that is operatively connected to the actuator, wherein the control system is programmed to:
   a) determine whether there is a failure in the tensioner; and
   b) output a signal that is indicative of a failure in the tensioner based on the determination made in step a).

16. A tensioner as claimed in claim 1, wherein the control valve includes a valve member and an electric actuator operatively connected to the valve member, and the control system is programmed to:
   c) control current to the actuator so as to control the position of the control valve; and
   d) determine the position of the main piston in the main piston chamber; and
   e) output a signal that is indicative of a failure in the tensioner based on the current to the actuator and the determination made in step d).

17. A tensioner as claimed in claim 16, wherein, in step d) the control valve determines the position of the main piston in the main piston chamber based on signals from a sensor that are indicative of whether there is belt slip.

18. A tensioner as claimed in claim 16, wherein, in step d) the control valve determines the position of the main piston in the main piston chamber based on signals from a position sensor mounted to the main piston chamber that is positioned for sensing a feature on the main piston.

* * * * *